US006607070B2

(12) United States Patent
Brommer et al.

(10) Patent No.: US 6,607,070 B2
(45) Date of Patent: Aug. 19, 2003

(54) METHOD AND DEVICE FOR TRANSFERRING BOOK BLOCKS INTO A TRANSPORT DEVICE BELONGING TO A BOOKBINDING MACHINE

(75) Inventors: Carsten Brommer, Lengerich (DE); Ansgar Rohe-Krebeck, Steinfeld-Mühlen (DE); Christoph Schmücker, Rahden (DE)

(73) Assignee: Kolbus GmbH & Co. KG, Rahden (DE)

( * ) Notice: Subject to any disclaimer, the term of this patent is extended or adjusted under 35 U.S.C. 154(b) by 0 days.

(21) Appl. No.: 09/952,750

(22) Filed: Sep. 14, 2001

(65) Prior Publication Data

US 2002/0071742 A1 Jun. 13, 2002

(30) Foreign Application Priority Data

Sep. 14, 2000 (DE) ........................................ 100 45 401

(51) Int. Cl.[7] ................................................ B65G 25/00

(52) U.S. Cl. ................................ 198/621.1; 198/468.2; 198/464.2; 412/30

(58) Field of Search ......................... 198/621.1, 341.05, 198/468.2, 464.2; 414/222.02, 226.01

(56) References Cited

U.S. PATENT DOCUMENTS

| | | | | | |
|---|---|---|---|---|---|
| 4,556,353 | A | * | 12/1985 | Ehlermann | 412/5 |
| 5,261,769 | A | * | 11/1993 | Leclerc | 412/4 |
| 5,467,864 | A | * | 11/1995 | McCoy et al. | 198/409 |
| 5,771,561 | A | * | 6/1998 | Hofele | 29/563 |
| 5,803,231 | A | * | 9/1998 | Lauke | 198/621.1 |
| 5,842,370 | A | * | 12/1998 | Hofele et al. | 72/405.09 |
| 6,158,940 | A | * | 12/2000 | Nehring | 412/9 |
| 6,168,363 | B1 | * | 1/2001 | Nehring | 412/30 |
| 6,250,868 | B1 | * | 6/2001 | Schmucker | 412/25 |

* cited by examiner

*Primary Examiner*—Joseph E. Valenza
*Assistant Examiner*—Rashmi Sharma
(74) *Attorney, Agent, or Firm*—Alix, Yale & Ristas, LLP

(57) ABSTRACT

A method for transferring book blocks or the like into a transport device of a bookbinding machine. The book block is first clamped in a force-locking manner. At least one corner of the back edge or of the front edge of the book block is aligned with a position, which can be set in a predefined manner, by relative displacement of the two sides of the book block in the plane of the book block. The book block is then clamped in a force-locking manner by the transport device.

12 Claims, 1 Drawing Sheet

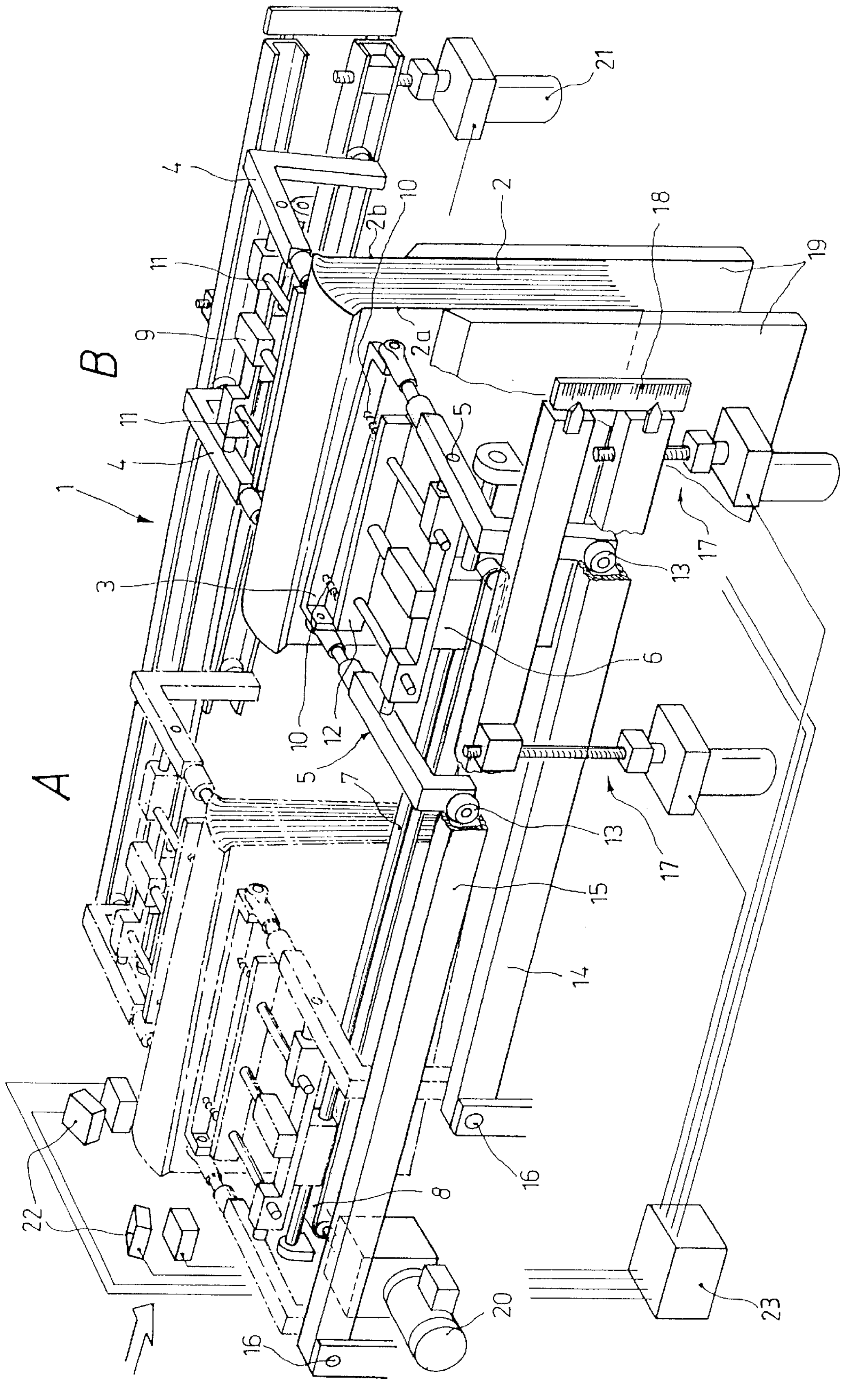
A
B
1
2
2a
2b
3
4
5
6
7
8
9
10
11
12
13
14
15
16
17
18
19
20
21
22
23

METHOD AND DEVICE FOR TRANSFERRING BOOK BLOCKS INTO A TRANSPORT DEVICE BELONGING TO A BOOKBINDING MACHINE

BACKGROUND OF THE INVENTION

The present invention relates to a method and device for transferring book blocks into a transport device belonging to a bookbinding machine, which transport device clamps-in the book blocks.

The earlier German patent application, file reference No. 199 55 993.7 by the same applicant discloses a machine for casing book blocks into book covers by sticking the outer end papers of a book block to the inner faces of the boards of a book cover. In the so-called casing-in machine, the book block is fed, with its back pointing upwards, to a picking-up point by an infeed conveyer. For the purpose of picking up and releasing the book blocks, the infeed conveyer has pneumatically controlled rails which grasp the book block in the region of the fold in order to feed it, according to a cycle and in a manner aligned with the center of the height of the book block, to a gripper in the picking-up point. Under these circumstances, the end papers are spread out for the purpose of being taken over by the gripper which is capable of traveling between a lower and an upper turning-over position, grasps the book block between the spread-out end papers, conveys it out of the lower picking-up point, past rollers for applying an adhesive to the end papers, and into an upper joining point, and unites it with a book cover which is held in position. Folding flaps with suction components take over the boards of the book cover, which is lying flat and is held in position, and transfer them into the upper joining point in a lifting-and-pivoting movement. As the process continues, the folding flaps guide the boards, in a closing movement, first to the outer end papers which are resting against the gripper, and finally to the book block after the taking-over of the book by shaping rails and the release of the book block by the gripper which moves downwards.

The qualitative appearance of a book is determined, inter alia, by the position of the end papers of the book block on the insides of the boards of the book cover. Both the book block and also the book cover are subject to systematic deviations in shape and size, the reasons for which lie, on the one hand, in the prefabrication and, on the other, in the intermediate storage or transport. These may include book blocks which are obliquely cut during block production, book blocks which are warped as a result of storage on a pallet, book blocks which are advanced in a one-sided manner during transport towards the take-over point of the infeed conveyer, or obliquely produced covers as a result of pasteboard parts which are not cut out squarely. The book block and book cover now have to be aligned with one another in such a way that the deviations, which can definitely vary towards different values during manufacture, for example in the event of a change of pallet, are mediated.

SUMMARY OF THE INVENTION

This is where the invention starts, with the object of proposing a method and device for transferring book blocks or the like into a transport device belonging to a bookbinding machine, which transport device clamps-in the book blocks, whereby an enhancement of the quality of the products is achieved.

BRIEF DESCRIPTION OF THE DRAWINGS

The invention will be explained in greater detail below with the aid of the drawing, in which an infeed conveyer with an aligning arrangement according to the invention is represented in a perspective view by way of an example.

DETAILED DESCRIPTION OF THE PREFERRED EMBODIMENT

Book blocks 2, which have preferably been rounded and pressed and which are to be cased into book covers, pass into an infeed conveyer 1 belonging to a bookbinding machine with their backs pointing upwards. Spring clamping bars 3 belonging to the infeed conveyer grasp the book block 2 in the region of the fold in order to bring it cyclically, with a constant stroke and aligned with the centre of the height of the book block, from a take-over point "A" into a discharge point "B" in the book casing-in machine. The clamping bars 3 are located, at the ends, on articulating levers 4 which are mounted about a pivot 5 on a carriage 6 and permit length-adjustment. The carriages 6 are displaceable on linear guides 7 and are driven by servomotors 20 via toothed belts 8 for the purpose of performing a to-and-fro stroke. For accelerated setting of the adhesive during casing-in, the clamping bars 3 may be heated for the purpose of warming-up the book block 2.

The clamping bars 3 are controlled into a closing position and an opening position via pneumatic cylinders 9 on the carriages 6. The gripping forces acting on the book block 2 from opposite sides are applied by pressure springs 10 and pressure rails 12 between the clamping bars 3 and the pneumatic cylinders 9, which pressure rails 12 can be displaced on guides 11. Since the pneumatic cylinders 9 apply substantially higher gripping forces than the pressure springs 10, centering of the middle of the book block 2 via the thickness of the latter also occurs in the conveying system.

In order to align the corners of the back or of the front edge of an inherently warped book block 2 which is held in a force-locking manner—in the exemplified embodiment, the two corners which lie at the front, viewed in the direction of conveyance—at the same height in relation to one another and at the same height in relation to the two corners lying at the rear, and to deliver them, in a manner held by force-locking, to a transport device belonging to a book casing-in machine, provision is made, according to the invention, for the two sides of the book block 2 to be displaced, relative to one another, in the plane of the book block. To this end, the front part and rear part of each side of the book block 2—and thereby also each corner of the back or of the front edge of the block—are adjustable in height, independently of one another, in the plane of the book block 2 via the clamping bars 3. At their free ends, the articulating levers 4 carry rollers 13 which run in separate control tracks 14 and 15 which can be offset vertically in relation to one another. The control tracks 14 and 15 are pivotably mounted, at the ends, about a pivot 16 and are vertically adjustable individually on the opposite side—which is the front side, viewed in the direction of conveyance—via adjusting arrangements 17 with the aid of a scaling system 18.

The alignment of the corners of the back, by relative displacement of the two sides of the book block 2, with defined vertical positions is effected in the course of transfer from the take-over point "A" to the discharge point "B", at which the aligned book block 2 is taken over, in a manner held by force-locking, by the transport device 19 of the book casing-in machine. Preferably, each of the carriages 6 is activated by a separate servomotor 20. As a result, the corners of the book block may be displaced relative to one another in the direction of the height of the book block, so that alignment of the corners of the top edge or of the bottom edge of the book block in relation to a line extending perpendicularly to the plane of the book block is possible. Alternatively, one of the servomotors 20 may act as a common servomotor to drive both carriages 6, and the other servomotor 20 may be connected to a single one of the carriages 6 to provide for relative movement between the corners by correcting the stroke of carriage 6.

According to the preferred embodiment, the vertical adjustment of the control tracks 14 and 15 to a position which can be set in a defined manner is carried out by hand. However it can also be effected via motor-operated final control elements 21 which are actuated centrally at a different point by suitable control arrangements. The positions of the corners of the back or of the front edge can be ascertained with the aid of transducers 22 placed above the corners of the book block in the take-over station "A". The position signals generated by the transducers 22 are received by a controller 23 which compares the measured position to a predetermined desired position. In the event of deviation from predetermined desired positions, which have been generated, for example, by measuring the cover fed in, path-dependent values are ascertained and fed to the motor-actuated final control elements 21 for the vertical adjustment of the control tracks 14, 15, and to the servomotors 20 for the correction of the feed stroke. As a result of this further refinement, it is possible not only to offset systematic deviations of the book blocks and book covers, but also to compensate for defects which occur in a random manner.

What is claimed is:

1. Method for transferring book blocks into a transport device of a bookbinding machine, each book block having oppositely disposed sides defining a plane, top and bottom edges defining a height, and front and back edges, the front, back, top and bottom edges forming a plurality of corners, the method comprising the steps of:

clamping the book block in a force-locking manner;

aligning at least one corner of the back edge or of the front edge of the book block with a position, which can be set in a predefined manner, by relative displacement of the two sides of the book block in the plane of the book block; and clamping the book block in a force-locking manner with the transport device.

2. Method according to claim 1, wherein the corners of the back edge or the corners of the front edge of the book block are aligned at the same height in relation to one another.

3. Method according to claim 1, wherein the corners of the back edge or the corners of the front edge at the top edge the book block are aligned, in the direction of the height of the book block, with a line extending perpendicularly to the plane of the book block.

4. Method according to claim 1, wherein the corners of the back edge or the corners of the front edge at the bottom edge of the book block are aligned, in the direction of the height of the book block, with a line extending perpendicularly to the plane of the book block.

5. Method according to claim 1, further comprising the steps of:

measuring the positions of the corners of the back edge or the corners of the front edge of the book block as actual values with transducers;

determining path-dependent values from the measured positions of the corners; and actuating motor-operated final control elements to compensate for deviation from desired positions.

6. Method according to claim 1, wherein the book block is aligned for transfer to the transport device in the course of transfer from a take-over point to a discharge point.

7. A conveyor system for cyclically transferring book blocks in a direction of transfer from a take-over point to a transport device of a bookbinding machine at a discharge point of the conveyor system, each book block having oppositely disposed sides defining a plane and front and back portions, the conveyor system comprising:

first and second clamping bars which are moveable relative to one another, each of the clamping bars having oppositely disposed ends;

biasing means for biasing each clamping bar to hold the book block in a force-locking manner from opposite sides;

clamping bar actuating means for selectively picking up and releasing the book block; and clamping bar adjustment means for adjusting the front portion and rear portion of each side of the book block in the plane of the book block.

8. Conveyor system according to claim 7 wherein the clamping bar adjustment means comprises:

first and second pairs of control tracks, each of the control tracks extending longitudinally in the direction of transport from a take-over end to a discharge end and being adjustable in the plane of the book block;

first and second linear guides, each of the linear guides extending longitudinally in the direction of transport;

first and second carriages adapted for traveling on the first and second linear guides, respectively;

drive means for driving the first and second carriages along the first and second linear guides; and first and second pairs of articulating levers, each of the articulating levers having proximal and distal ends, a roller being rotatably mounted to each distal end, the proximal end of the first pair of articulating levers being connected to the ends of the first clamping bar, the rollers of the first pair of articulating levers rotatably engaging the first pair of control tracks, the proximal ends of the second pair of articulating levers being connected to the ends of the second clamping bar, the rollers of the second pair of articulating levers rotatably engaging the second pair of control tracks, the first and second pair of articulating levers being rotatably mounted to the first and second carriages, respectively.

9. Conveyor system according to claim 8 wherein the clamping bar adjustment means further comprises control track adjustment means for adjusting each of the control tracks in the plane of the book block, the clamping bar adjustment means being disposed proximate to the discharge end of the control tracks, the take-over end of each control track rotating about a pivot point.

10. Conveyor system according to claim 8 wherein the clamping bar adjustment means comprises first and second motor-operated actuating drives for adjusting the first and second pairs of control tracks, respectively.

11. Conveyor system according to claim 8 wherein the front portion and rear portion of each side of the book block can be independently aligned with a line extending perpendicularly to the plane of the book block.

12. Conveyor system according to claim 8 wherein the drive means comprises a common first drive for driving the first and second carriages along the first and second linear guides and a second drive which is superimposed on one of the first or second carriages for modifying the stroke of the one carriage from the stroke of the other carriage.

* * * * *